US005838336A

United States Patent [19]

Ross

[11] Patent Number: 5,838,336

[45] Date of Patent: Nov. 17, 1998

[54] METHOD AND SYSTEM FOR DISPLAYING IMAGES ON A DISPLAY DEVICE

[75] Inventor: Jonathan P. Ross, Seattle, Wash.

[73] Assignee: Microsoft Corporation, Redmond, Wash.

[21] Appl. No.: 752,074

[22] Filed: Nov. 19, 1996

(Under 37 CFR 1.47)

Related U.S. Application Data

[63] Continuation of Ser. No. 641,051, Apr. 29, 1996, abandoned.

[51] Int. Cl.[6] .................................................. G06F 13/00

[52] U.S. Cl. .......................... 345/508; 345/162; 345/435; 345/113

[58] Field of Search .................................... 345/507, 509, 345/162, 501, 435, 113, 114, 115, 116, 157, 203

[56] References Cited

U.S. PATENT DOCUMENTS

| | | | |
|---|---|---|---|
| 5,559,533 | 9/1996 | Hicok et al. | 345/197 |
| 5,598,525 | 1/1997 | Nally et al. | 345/520 |

*Primary Examiner*—Kee M. Tung
*Attorney, Agent, or Firm*—Seed and Berry, LLP

[57] ABSTRACT

The present invention provides an improved method and system for displaying images on a display screen. It includes a display screen, an on-screen memory, a cursor memory, and a display processor. The display processor in a normal mode displays on the display screen a graphics image stored in the on-screen memory. When the display processor is in an overlay mode, it simultaneously displays the stored graphics image, and the image stored in the cursor memory in an image window over a selected portion of the stored graphics image in the on-screen memory. The image window hides the selected portion of the stored graphics image. While the display processor is in the overlay mode, a second image is prepared and stored in the selected portion of the stored graphics image which is hidden by the image window. Since the image displayed in the image window hides the second image being prepared, the second image preparation is transparent to a user and does not interfere with the display of the image stored in the cursor memory. When the second image is stored, the display processor is switched to the normal mode to simultaneously display the stored graphics image with the stored second image in the selected portion of the stored graphics image.

15 Claims, 7 Drawing Sheets

METHOD AND SYSTEM FOR DISPLAYING IMAGES ON A DISPLAY DEVICE

CROSS-REFERENCE TO RELATED APPLICATION

This application is a continuation of U.S. patent application Ser. No. 08/641,051, filed Apr. 29, 1996 now abandoned.

TECHNICAL FIELD

This invention relates to computer systems, and more particularly, to an improved method and system for displaying images on a display device.

BACKGROUND OF THE INVENTION

Today's multimedia computer systems have a video display adapter board that allows video images and computer graphics images to be displayed simultaneously on a display screen. Generally, the video display adapter has a display memory that contains a bitmap of the graphics image to be displayed. Each memory location of the display memory corresponds to a pixel of the display screen. To display the graphics image, the video display adapter retrieves the data from each memory location of the display memory and displays that data in the corresponding pixel of the display screen. A portion of the display memory can be defined as a video image portion for storing video images. When the video display adapter receives each video image from a sequence of video images, it stores the video image in the video image portion of the display memory. When the video display adapter displays the data in the display memory, it handles data representing graphics images and video images in the same way. Thus, the graphics images and video images can be displayed simultaneously on the display screen. For example, video images of a recorded TV program may be sequentially stored in a video image portion of the display memory to be displayed simultaneously with a graphics image of an electronic spreadsheet already stored in the display memory.

Some video display adapters simultaneously display video images and computer graphics images by using a transparency bitmask to define the video image portion of the display memory. FIG. 1 illustrates the use of a transparency bitmask. A display memory 120 receives a graphics image 126 of a word processing program from a graphics image source 112. The graphics image 126 may be sent directly to the display memory 120 through a CPU bus 130 or routed through a display processor 110. The display processor 110 has a bitmask 116 in which each bit corresponds to a pixel of a display screen 128 and to a memory location of the display memory 120. As each video image pixel is received from a video image source 118, the display processor 110 examines the corresponding bit from the bitmask 116. If the bit 132 is set, the display processor 110 stores the received video image pixel in the corresponding memory location of the display memory 120. If the bit is not set, however, the display processor 110 discards the video image pixel and does not overwrite the stored pixel of the graphics image 126. FIG. 1 shows a video image 122 of a cup stored in the video image portion 134 of the display memory 120. The stored video image 122 is displayed simultaneously with the stored graphics image 126 of the word processing program on the display screen 128.

To display a sequence of video images using such a video display adapter, the video image portion of the display memory is repeatedly overwritten by the next video image in the sequence. The display processor, however, cannot update the video image portion while it is retrieving data from the memory locations of the display memory for display on the display screen. Consequently, the next video image in the sequence cannot be written to the display memory while the display processor is retrieving data from the memory location. This inability to simultaneously store and retrieve data limits the effective speed at which video images can be displayed. Moreover, the graphics image that is to replace the video image portion at the end of displaying a sequence of video images cannot be written into display memory until all the video images have been displayed. Thus, this inability also affects the speed of transition from a video image to a graphics image.

Another video display adapter use is an alternative method of displaying a sequence of graphics images on a computer display screen that is known as page flipping or image flipping. Page flipping is described in "Computer Graphics," (Second Edition 1987), by J. Foley, A. van Dam, S. Feiner, and J. Hughes, and published by Addison-Wesley Publishing Company, which is incorporated herein by reference. With page flipping, the display processor has access to two display memories that each represents the entire display screen. To display a sequence of graphics images, each image in the sequence is alternately written to the first and second display memories. After the image is written, the display processor is directed to display the image from that display memory. While the image is being displayed, the next image in the sequence is written to the other display memory. For example, an animation program stores a graphics image in a first display memory. While the stored graphics image is being displayed, the program stores the next graphics image in a second display memory. After displaying the graphics image in the first display memory, the display processor switches to the second display memory and displays the stored graphics image. While the graphics image in the second display memory is being displayed, the next graphics image is stored in the first display memory. Hence, the animation program could draw the next image of the animation without disrupting the current image being displayed.

SUMMARY OF THE INVENTION

The present invention provides an improved method and system for displaying images on a display screen. It includes a display screen, an on-screen memory, a cursor memory, and a display processor. The on-screen memory generally stores a graphics image produced by a software program such as a word processing program. The display processor in a normal mode displays the stored graphics image on the display screen. The cursor memory generally stores images which are displayed in an image window. When the display processor is in an overlay mode, it simultaneously displays the stored graphics image, and the image stored in the cursor memory in the image window over a selected portion of the stored graphics image. The image window hides the selected portion of the stored graphics image. While the display processor is in the overlay mode, a second image is prepared and stored in the selected portion of the stored graphics image which is hidden by the image window. Since the image displayed in the image window hides the second image being prepared, the second image preparation is transparent to a user and does not interfere with the display of the image stored in the cursor memory. When the second image is stored, the display processor is switched to the normal mode to simultaneously display the stored graphics image with the stored second image in the selected portion of the stored graphics image.

DETAILED DESCRIPTION OF THE INVENTION

Figure 1:
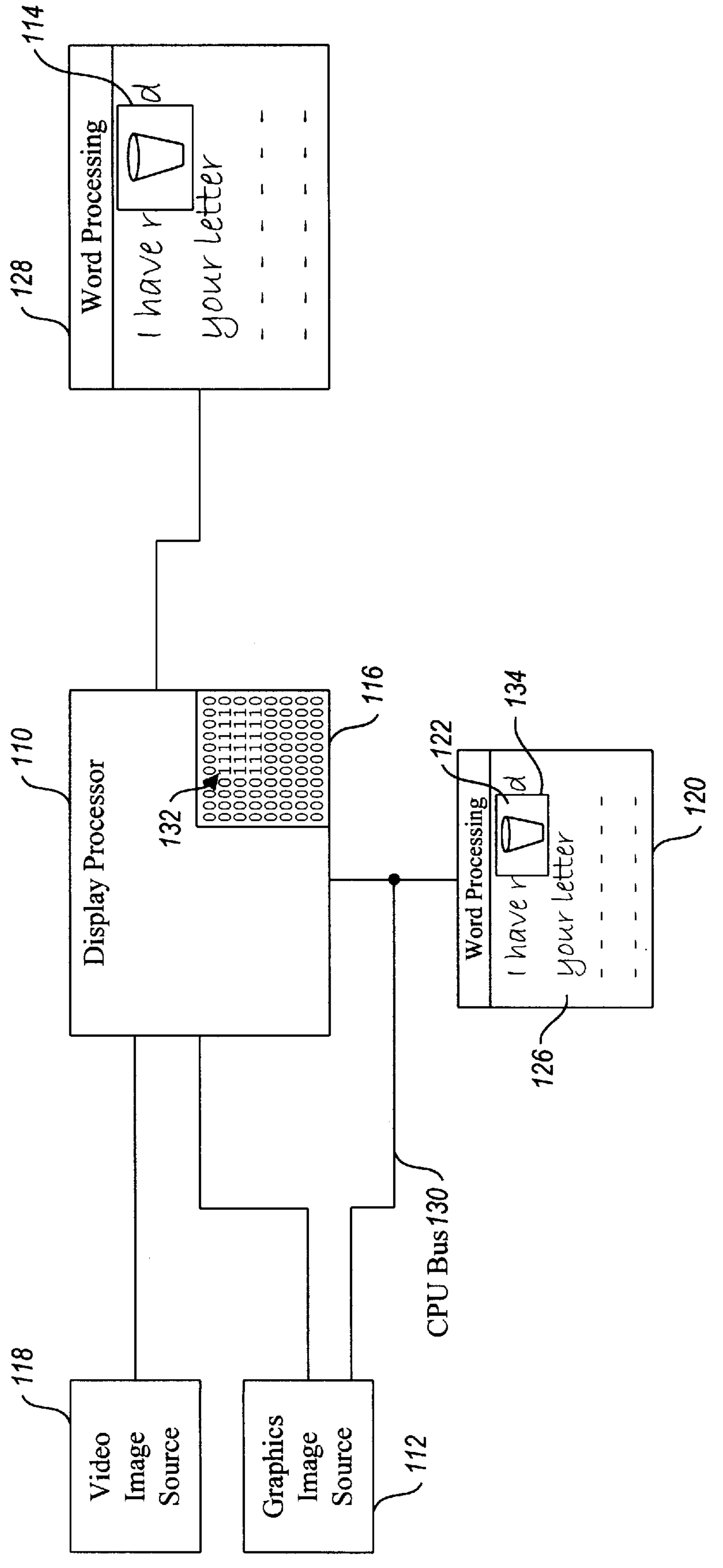
FIG. 1 is a block diagram of a display processor capable of simultaneously displaying video images and graphics images on a display screen.
Figure 2:
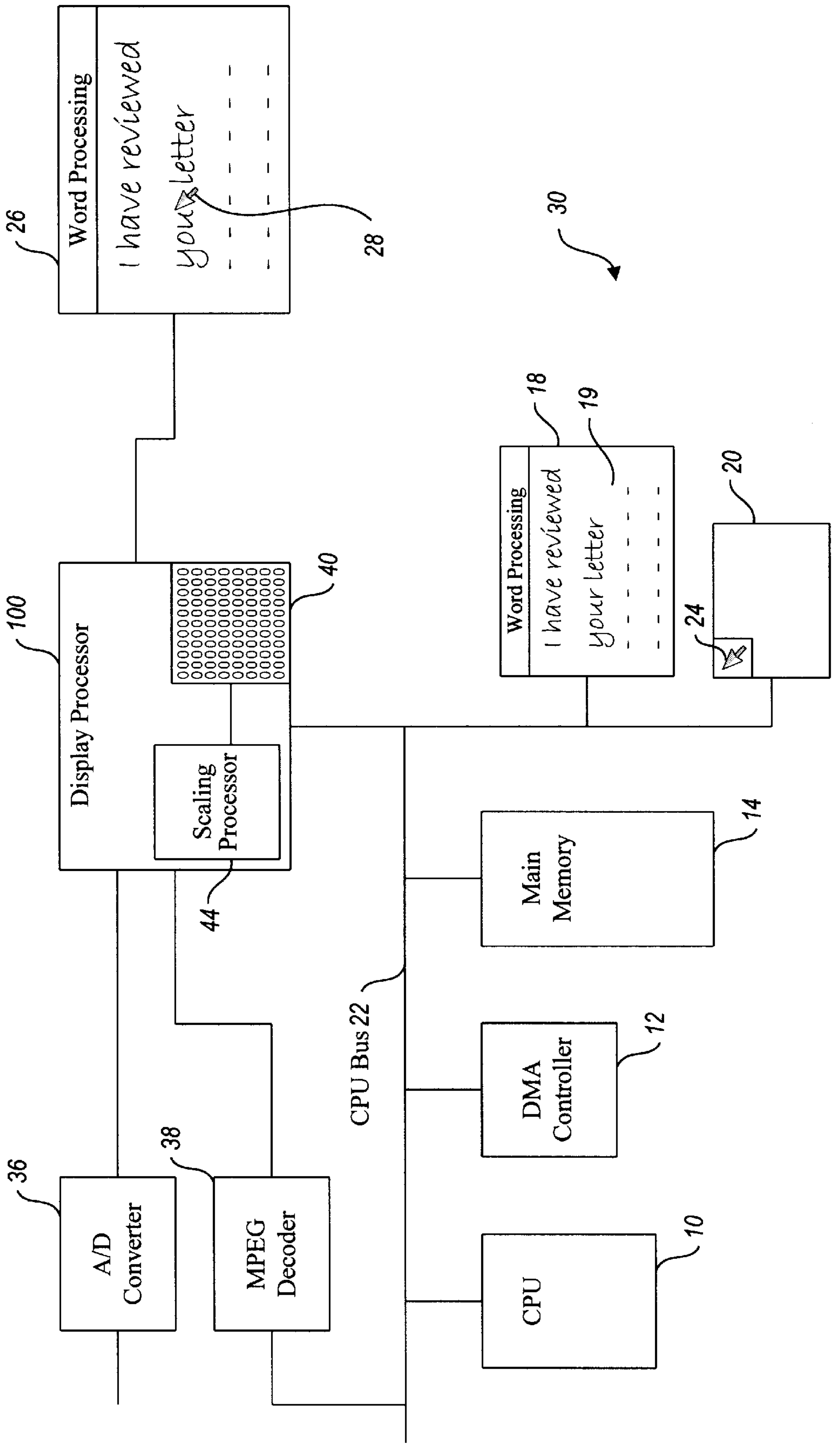
FIG. 2 is a block diagram of a display system with a hardware cursor capability.
Figure 3:
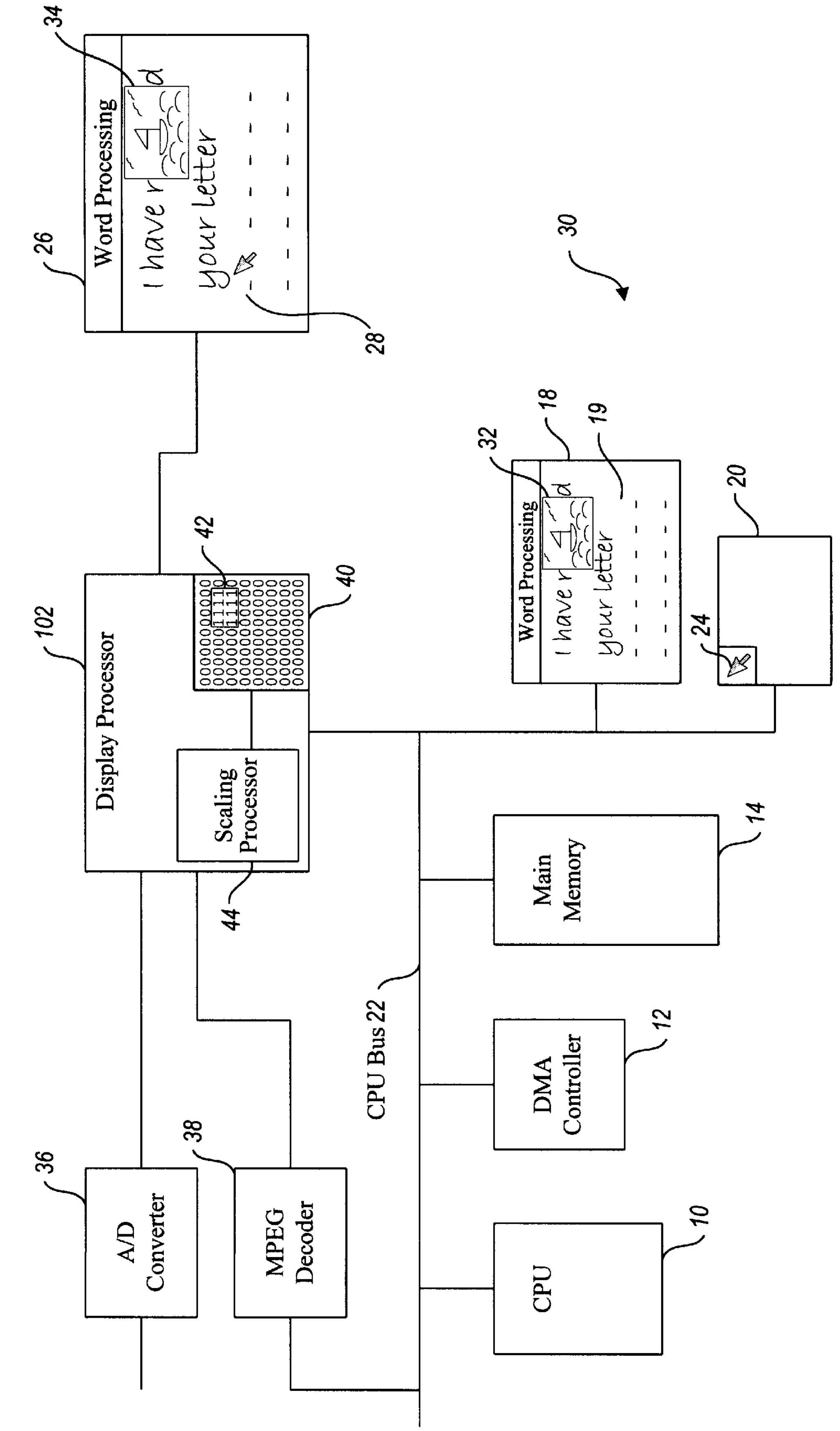
FIG. 3 is a block diagram of a display system capable of displaying video images over a selected portion of a graphics image.

One aspect of the present invention provides a method and system for simulating page flipping using a video display adapter that is not designed to support page flipping. In another aspect, the present invention provides a method and system for storing a graphics image in a video image portion of display memory simultaneously with the displaying of the video image. The present invention is best understood with reference to a video display adapter that is not designed to support page flipping. FIGS. 2 and 3 are block diagrams of a display system that uses a video display adapter that does not support page flipping. FIG. 2 illustrates the operation of the hardware cursor capability of such a video display adapter. A central processing unit (CPU) 10 communicates with various hardware modules of the display system through a CPU bus 22. A main memory 14 is used for storing an operating system of the display system and various applications programs such as a word processing program. A direct memory access (DMA) controller 12 is used to perform large memory block transfers between an external storage device (not shown) and main memory 14 or between the main memory 14 and a display memory 30. A display processor 100 communicates with the CPU 10 over the CPU bus 22 and includes the display memory 30 (also known as a frame buffer). The display memory 30 includes an on-screen memory 18 and a cursor memory 20. The on-screen memory 18 generally is used for storing images generated by the application programs. FIG. 2 shows the on-screen memory 18 with a graphics image 19 of a word processing program. The graphics image 19 may be sent directly to the on-screen memory 18 through the CPU bus 22 or routed through the display processor 100. The display processor 100 converts the stored graphics image 19 in the on-screen memory 18 to an analog signal suitable for display on the display screen 26.

The cursor memory 20 generally is a small area of the display memory that is used for storing graphics images, such as a pointer arrow to implement what is known as a sprite or hardware cursor. The CPU 10 tracks the location of the cursor as the user moves an input device such as a mouse (not shown). As the location of the cursor changes, the CPU 10 notifies the display processor 100 where to display the cursor. The display processor 100 then displays the cursor image stored in the cursor memory over a portion of the display screen 26, which overlays the corresponding on-screen memory. Since the cursor image is not written to the on-screen memory 18, it frees the CPU 10 and the display processor 100 from performing a large memory block movement every time the user moves the mouse. FIG. 2 illustrates the cursor image 28 overlaying a portion of the display screen corresponding to the stored letter "r." When the display processor is in normal mode, it displays all the data in the on-screen memory. When the display processor is also in a hardware cursor mode, it overlays a portion of the display screen with the contents of the cursor memory as illustrated in FIG. 2.

FIG. 3 illustrates the bitmask capability of the video display adapter. The display processor 102 is capable of accepting several different video image formats. One format is a Video Graphics Array (VGA) graphics data which is generally of an 8-bit or 16-bit palletized data. A second format is an analog video signal available from a video source such as a VCR (not shown). The analog video signal goes through an A/D converter 36 that converts the signal into a digital image data which is generally in a 16-bit or 24-bit non-palletized data format. A third image format is a compressed video data such as Microsoft Video for Windows .AVI files. An MPEG (Motion Picture Expert Group) decoder 38 decodes the compressed video data (not shown) and converts it into digital image data which is also generally in a 16-bit or 24-bit non-palletized data format. The display processor 102 receives a video image and routes the received video image pixels to the on-screen memory 18 based on a bitmask 40. The bitmask 40 in the display processor 102 has a bit for every pixel of the display screen 26. Each bit tells whether or not a video image pixel is written to the on-screen memory 18. When any given bit is set, the display processor 102 stores the received video image pixel in the on-screen memory 18 by overwriting the corresponding pixel of the graphics image 19 stored in the on-screen memory 18. If the bit is not set, however, the display processor 102 does not overwrite the corresponding pixel of the graphics image 19. The bitmask 40 defines the video image portion of the on-screen memory 18. One video display adapter that uses the bitmask is described in "VIPeR Video Image Processor Data Book," (1994), published by Tseng Labs, Inc., and in "W32p ET4000/W32p Graphics Accelerator Data Book," (1994), also published by Tseng Labs, Inc., both of which are incorporated herein by reference.

One aspect of the present invention simulates page flipping of the on-screen memory. To simulate page flipping, the bitmask is initialized to define the video image portion of the display screen. During the display of a sequence of video images, the first video image is written to the video image portion of the on-screen memory. While the on-screen memory is being displayed, the second video image is stored in the cursor memory. Upon completion of the display of the on-screen memory, the display processor is directed to overlay the video image portion of the on-screen memory with the cursor memory to effect the display of the second video image. While the on-screen memory with the cursor memory overlay is being displayed, the display processor stores the third video image in the video image portion of the on-screen memory and then displays the on-screen memory without the overlay by the cursor memory. The page flipping for graphics images occurs in an analogous manner by alternately storing the graphics images in a certain portion of the on-screen memory and in the cursor memory.

In another aspect, the present invention provides "writing behind" a sequence of video images being displayed on the display screen. The display processor is set to overlay mode and the video images are stored in cursor memory. While the video images are sequentially being written to cursor memory, a graphics image that is to be written behind is stored in the on-screen memory in the area corresponding to the overlaid portion. When the display of the sequence of video images is complete, the display processor is set to non-overlay mode to effect the immediate display of the graphics data. Alternatively, to display a sequence of video images, the bitmask is initialized to define the video image portion of the display screen. During the display of the sequence of video images, the graphics image that is to be written behind is stored in cursor memory. When the display of the sequence of video images is complete, then the display processor is set to display the cursor memory over the portion of the display screen corresponding to the video image display portion. Eventually, the on-screen memory is updated to contain the written behind graphics image in the area where the video image portion was stored and the display processor is set to the normal, non-overlaid mode.

Figure 4:
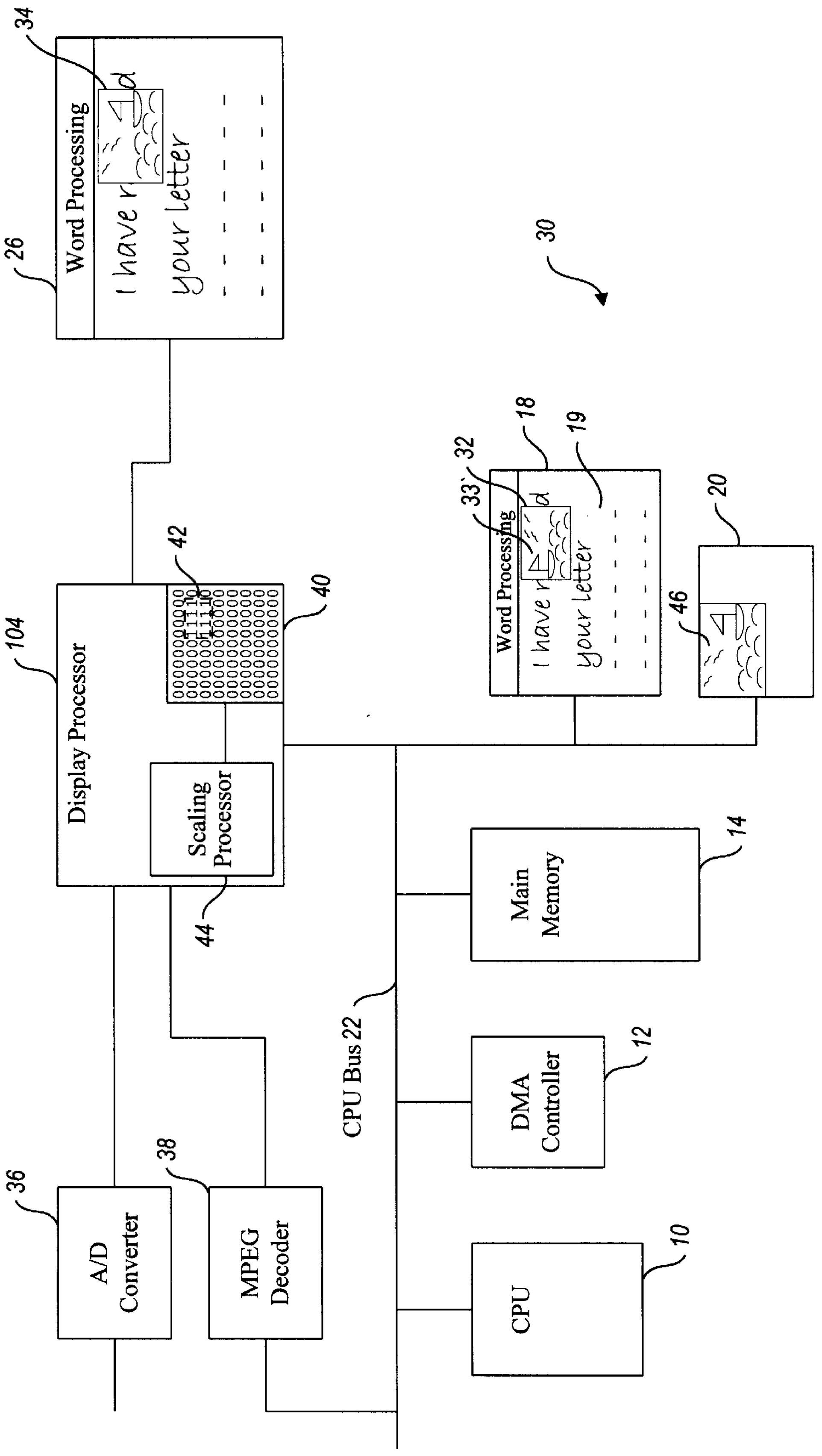
FIG. 4 is a block diagram of a preferred embodiment of a display system according to the principles of the present invention.

FIG. 4 is a block diagram of a preferred embodiment of a display system according to the principles of the present invention. The display processor can store video images in either the video image portion of the on-screen memory or in the cursor memory. The display processor 104 also has a normal mode for displaying the image 19 stored in the on-screen memory 18 regardless of what is stored in the cursor memory 20. The display processor 104 in FIG. 4 is in an overlay mode and is displaying the image 19 stored in the on-screen memory 18 and the stored image 46 over the selected portion 32. While the display processor 104 is displaying the stored image 46 over the selected portion 32, it is concurrently storing the next video image 33 in the selected portion 32 and overwriting the selected portion 32 of the graphics image 19. By switching between the normal mode and the overlay mode of the display processor 104, page flipping of a sequence of video images within the image window 34 is achieved. Since the display processor 104 can select from a variety of image formats, the source of the images to be displayed may be mixed and matched according to the user preference. For example, one image may be from a CD-ROM drive (not shown) which is in a compressed video format, and the next image may be from the main memory 14 in an 8-bit palletized format. The image from the CD-ROM drive is converted into a 24-bit non-palletized data and stored in the cursor memory 20. While the display processor 104 is in the overlay mode and is displaying the stored image 46 in the image window 34, the next image from the main memory 14 is stored in the selected portion 32 of the on-screen memory 18. When the display processor 104 switches to the normal mode, the next image 33 stored in the selected portion 32 of the on-screen memory 18 is displayed in the image window 34. Alternatively, the sequence of images to be displayed in the image window 34 may come exclusively from the main memory 14 in an 8-bit palletized format. Still another possibility is that the sequence of images may be a combination of the 8-bit palletized format from the main memory 14 and an analog video image format from the VCR (not shown).

Figure 5:
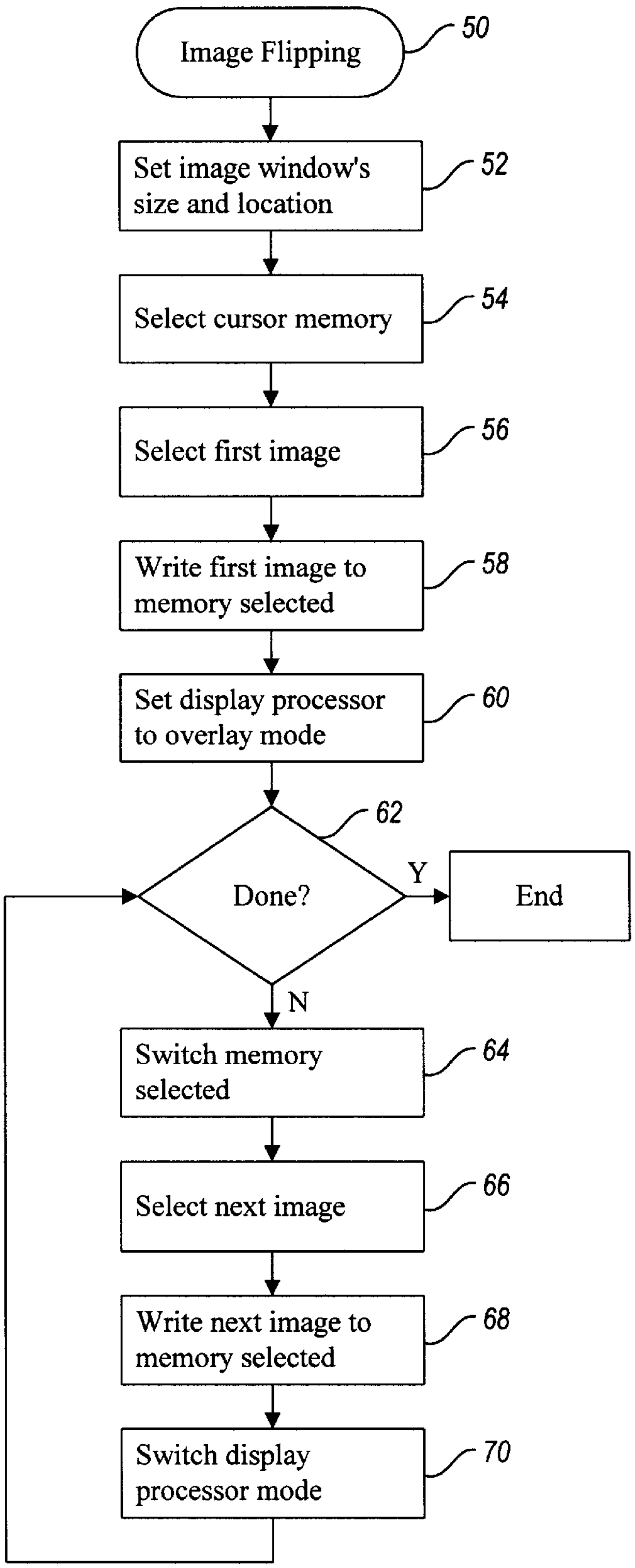
FIG. 5 is a flowchart of an image flipping routine for switching between stored images to be displayed over a selected portion of the stored graphics image.

FIG. 5 is a flowchart of an image flipping routine 50 for switching between stored images to be displayed over a selected portion 32 of the stored graphics image 19. In step 52, the routine sets the size and location of an image window 34 in which to display the sequence of video images. The display processor 104 writes a pattern of is in a bitmask region 42 representing the selected portion 32 of the on-screen memory 18, which is to receive the images. The display processor 104 also initializes the scaling processor 44 for scaling the images according to the size of the image window 34. In step 54, the routine selects the cursor memory 20 for receiving an image. In step 56, a first image is selected. In step 58, the scaling processor scales the selected image according to the size of the image window 34. The display processor then writes the scaled image to the cursor memory 20. In step 60, the routine sets the display processor 104 to the overlay mode. At this point, the user sees the display screen 26 of FIG. 4 which shows the first sailboat image 46 in the image window 34 being displayed over the selected portion 32 of the graphics image 19 stored in the on-screen memory 18. In step 62, the routine tests whether there are more images to be displayed. If there are no more images to be displayed, then the page flipping routine 50 is finished. Otherwise, control passes to step 64. In step 64, the routine switches the portion of display memory previously selected, that is from on-screen memory to cursor memory, or vice versa. In step 66, the routine selects the next image. In step 68, the routine writes the selected next image to the selected memory. FIG. 4 shows a second sailboat image 33 being prepared in the selected portion 32 of the on-screen memory 18 while the display processor 104 is in the overlay mode and is displaying the first sailboat image 46 in the cursor memory 20 over the selected portion 32 of the graphics image 19 in the on-screen memory 18. In step 70, the routine switches the mode of the display processor, that is from normal mode to overlay mode or vice versa. Once the display processor mode is switched, control returns to step 62 and steps 62–70 are repeated until there are no more images.

Figure 6:
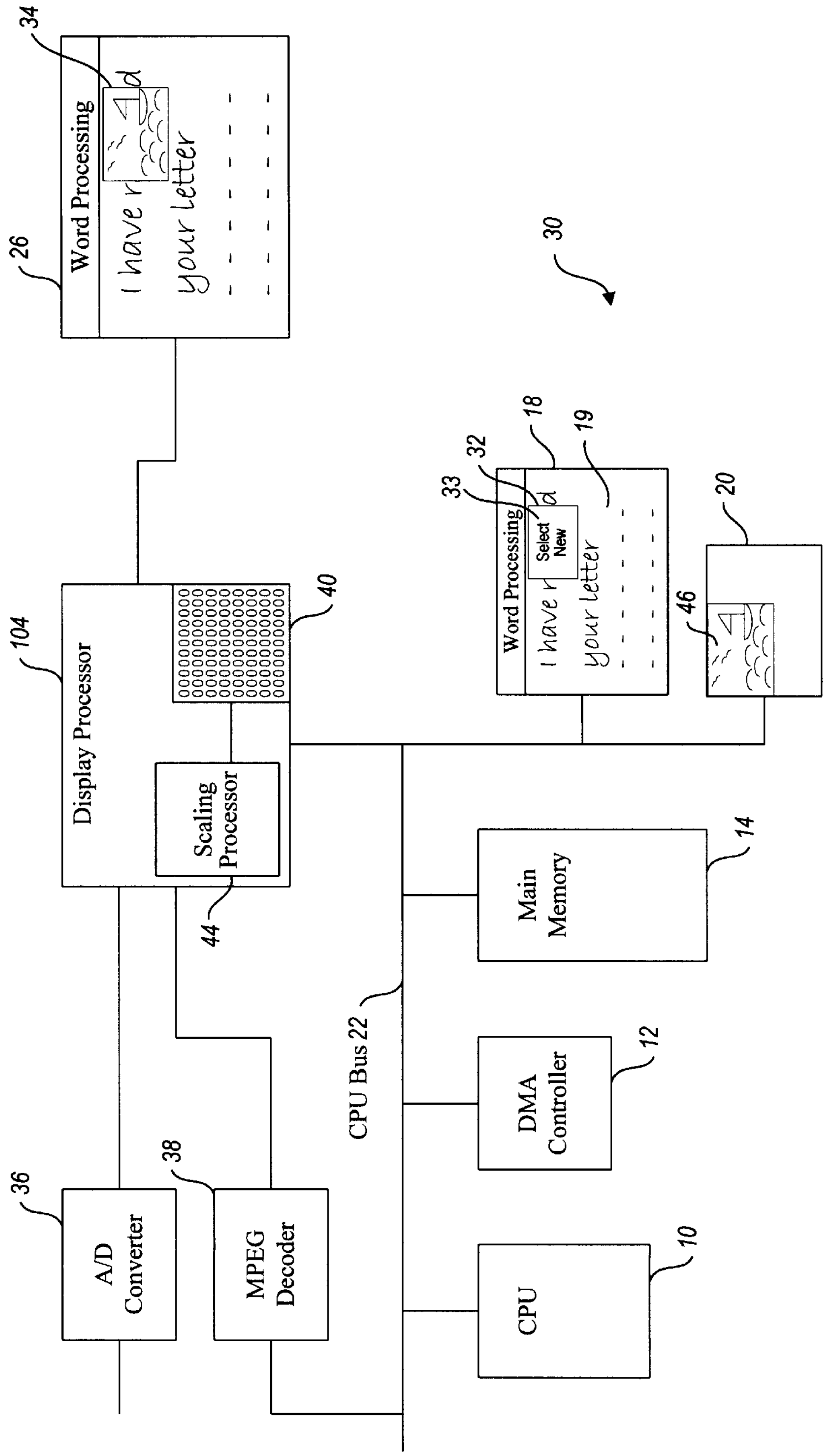
FIG. 6 is a block diagram of the display system of FIG. 4 in an alternative embodiment.

FIG. 6 is a block diagram of the display system of FIG. 4 in an alternative embodiment. The display processor 104 is set to the overlay mode. Then a sequence of video images 46 are successively stored in the cursor memory 20. As each image is stored, the display processor 104 displays the stored image 46 on the display screen 26 over the selected portion 32 of the on-screen memory 18. FIG. 6 shows an image sequence of a sailboat sailing through the water. While the sailboat images are being played through the cursor memory 20, a graphics image 33 is prepared behind the image window 34. Since the video images being displayed in the image window 34 hides the image 33 being prepared in the selected portion 32 of the on-screen memory 18, the image preparation is transparent to the user and does not interfere with the playing of video images. In the example shown, the graphics image is retrieved from the main memory to the selected portion of the on-screen memory through the CPU bus without using the display processor. Accordingly, all of the bits in the bitmask is set to 0. It will be understood, however, that if the graphics image is to be routed through the display processor, for example, to take advantage of the scaling processor, a set of bits in the bitmask representing the video image portion 32 of on-screen memory should be initialized. When the video play ends, the display processor 104 switches to the normal mode to reveal the prepared image 33 behind the image window 34.

Figure 7:
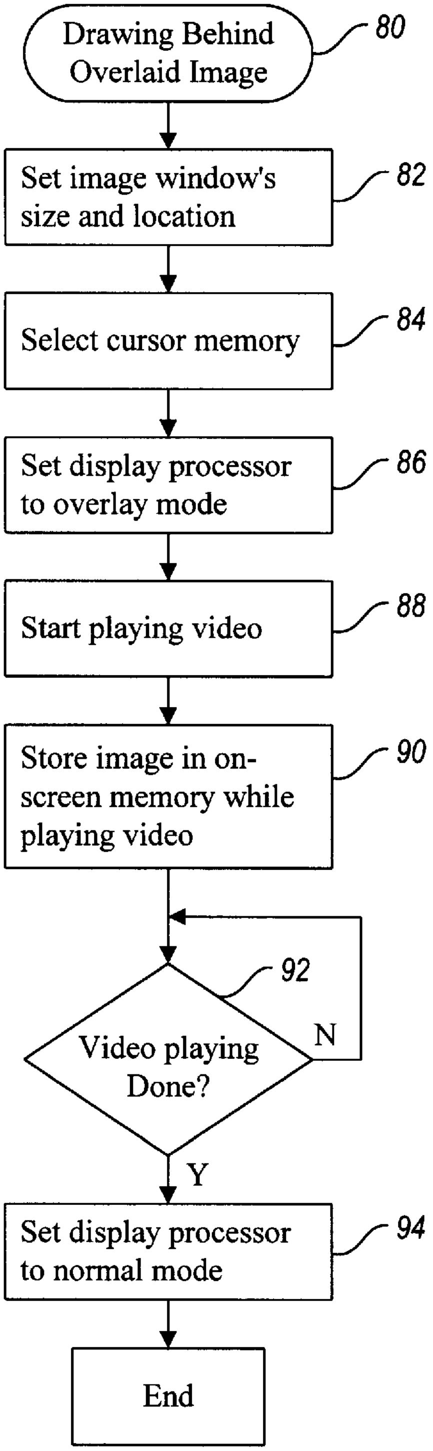
FIG. 7 is a flowchart of a draw behind routine for preparing a graphics image while the video images are being played over a selected portion of the displayed graphics image.

FIG. 7 is a flowchart of a draw behind routine 80 for preparing a graphics image while the video images are being played over a selected portion 32 of the stored graphics image 19. In step 82, the routine sets the size and location of an image window 34 in which to display the sequence of video images. The display processor 104 initializes the scaling processor 44 for scaling the images according to the size of the image window 34. In step 84, the routine selects the cursor memory 20 for receiving the sequence of video images. In step 86, the routine sets the display processor 104 to the overlay mode. In step 88, the routine sends the sequence of video images to the display processor. The display processor scales the receive video images accordingly and writes the scaled images to the cursor memory 20. Each video image 46 written to the cursor memory 20 overwrites the previous video image. As each image is written, the display processor 104 displays the stored image 46 on the display screen 26 over the selected portion 32 of the on-screen memory 18. At this point, the user sees the display screen 26 of FIG. 6 which shows the first video image 46 in the image window 34 being displayed over the selected portion 32 of the graphics image 19. In step 90, while the video images are being played through the cursor memory 20, the routine stores a graphics image in area 32. In step 92 the routine tests whether there are more video images to be displayed. In step 94, the display processor 104 is switched to the normal mode to reveal the prepared image 33 behind the image window 34.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

I claim:

1. In a display system having a display screen, an on-screen memory, a cursor memory, and a display processor having a normal mode for displaying the on-screen memory on the display screen, and an overlay mode for displaying the on-screen memory and the cursor memory over a selected portion of the on-screen memory, a method of displaying images on the display screen, the method comprising the steps of:

storing a first image in the on-screen memory;

storing a second image in the cursor memory;

setting the display processor to the overlay mode, wherein the display processor displays on the display screen the stored first image simultaneously with the stored second image over a selected portion of the stored first image in the on-screen memory;

while the display processor is in the overlay mode, storing a third image in the selected portion of the stored first image, wherein the third image overwrites the selected portion of the stored first image in the on-screen memory; and setting the display processor to the normal mode, wherein the display processor displays on the display screen the stored first image simultaneously with the stored third image.

2. The method according to claim 1, further comprising the steps of:

after the step of setting the display processor to the normal mode, storing a fourth image in the cursor memory, wherein the fourth image overwrites the stored second image; and setting the display processor to the overlay mode, wherein the display processor displays on the display screen the stored first image simultaneously with the stored fourth image over the selected portion of the stored first image in the on-screen memory.

3. The method according to claim 1 wherein the on-screen memory is memory mapped to the display screen, and the display processor includes a bitmask that controls which portion of the on-screen memory is to be overwritten, and the step of storing a third image includes:

programming the bitmask to overwrite the selected portion of the stored first image; and according to the bitmask, overwriting the selected portion of the stored first image with the third image while protecting a remaining portion other than the selected portion of the stored first image in the on-screen memory.

4. The method according to claim 1, further comprising the step of scaling the size of the second and third images to correspond to the size of the selected portion of the stored first image in the on-screen memory.

5. The method according to claim 4, further including the steps of:

selecting an image format of the second and third images; and according to the selection, converting the image format of the second and third images to a format suitable to be stored in the on-screen and cursor memory, respectively.

6. In a display system having a display screen, an on-screen memory, a cursor memory, and a display processor having a normal mode for displaying the on-screen memory on the display screen, and an overlay mode for displaying the on-screen memory and the cursor memory over a selected portion of the on-screen memory, a method of preparing an image to be displayed, the method comprising the steps of:

storing a first image in the on-screen memory;

setting the display processor to the overlay mode;

for each of a plurality of images, storing each image in the cursor memory to sequentially display on the display screen each stored image over a selected portion of the stored first image;

while the plurality of images are being stored in the cursor memory, storing a second image in the selected portion of the stored first image, wherein the second image overwrites the selected portion of the stored first image; and after the plurality of images are sequentially displayed on the display screen, setting the display processor to the normal mode to display the stored first image simultaneously with the stored second image in the selected portion of the stored first image.

7. A method of displaying images on a display screen, comprising the steps of:

storing a first image in an on-screen memory;

storing a second image in a cursor memory;

displaying on the display screen the stored first image simultaneously with the stored second image over a selected portion of the stored first image;

while the stored first image is being displayed simultaneously with the stored second image over the selected portion of the stored first image, storing a third image in the selected portion of the stored first image, wherein the third image overwrites the selected portion of the stored first image; and when the third image is stored in the selected portion of the stored first image, displaying on the display screen the stored first image with the stored third image in the selected portion of the stored first image.

8. The method according to claim 7 wherein the on-screen memory is memory mapped to the display screen, and the step of storing a third image includes:

programming a bitmask to overwrite the selected portion of the stored first image; and according to the bitmask, overwriting the selected portion of the stored first image with the third image while protecting a remaining portion other than the selected portion of the stored first image in the on-screen memory.

9. The method according to claim 7, further comprising the step of scaling the size of the second and third images to correspond to the size of the selected portion of the stored first image in the on-screen memory.

10. The method according to claim 9, further including the steps of:

selecting an image format of the second and third images; and according to the selection, converting the image format of the second and third images to a format suitable to be stored in the on-screen and cursor memory, respectively.

11. A method of preparing an image to be displayed on a display screen, the method comprising the steps of:

storing a first image in an on-screen memory;

for each of a plurality of images, repeating the following steps:

storing each image in a cursor memory; and displaying the stored first image and the stored each image over a selected portion of the stored first image;

while each of the plurality of images is being displayed over the selected portion of the stored first image, storing a second image in the selected portion of the stored first image; and after the plurality of images are displayed over the selected portion of the stored first image, displaying the stored first image and the stored second image in the selected portion of the stored first image.

12. A system for displaying an image while preparing another image to be displayed, the system comprising:

a display screen;

an on-screen memory;

a cursor memory;

means for storing a first image in the on-screen memory, and a second image in the cursor memory;

a display processor connected to the display screen, the on-screen memory, and the cursor memory, the display processor having a normal mode for displaying on the display screen the stored first image, and an overlay mode for displaying on the display screen the stored first image simultaneously with the stored second image over a selected portion of the stored first image; and means for storing a third image in the selected portion of the stored first image while the display processor is in the overlay mode such that when the display processor switches to the normal mode, the display screen displays the stored first image simultaneously with the stored third image in the selected portion of the stored first image.

13. The system according to claim 12 wherein the on-screen memory is memory mapped to the display screen, and the display processor includes a bitmask that controls which portion of the on-screen memory is to be overwritten.

14. The system according to claim 12 wherein the display processor includes a scaling processor for scaling the size of the second and third images to correspond to the size of the selected portion of the stored first image in the on-screen memory.

15. A computer readable storage device for controlling a computer system to display images on a display screen, by performing the steps of:

storing a first image in an on-screen memory;

storing a second image in a cursor memory;

displaying on the display screen the stored first image simultaneously with the stored second image over a selected portion of the stored first image;

while the stored first image is being displayed simultaneously with the stored second image over the selected portion of the stored first image, storing a third image in the selected portion of the stored first image, wherein the third image overwrites the selected portion of the stored first image; and when the third image is stored in the selected portion of the stored first image, displaying on the display screen the stored first image with the stored third image in the selected portion of the stored first image.

* * * * *